United States Patent
Herberger et al.

(10) Patent No.: US 7,856,429 B2
(45) Date of Patent: Dec. 21, 2010

(54) SYSTEM AND METHOD FOR A DIGITAL REPRESENTATION OF PERSONAL EVENTS ENHANCED WITH RELATED GLOBAL CONTENT

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 459 days.

(21) Appl. No.: 12/115,258

(22) Filed: May 5, 2008

(65) Prior Publication Data

US 2008/0275869 A1 Nov. 6, 2008

Related U.S. Application Data

(60) Provisional application No. 60/915,749, filed on May 3, 2007.

(51) Int. Cl.
G06F 7/00 (2006.01)
G06F 17/30 (2006.01)

(52) U.S. Cl. .................... 707/705; 715/716; 715/723

(58) Field of Classification Search .................. None
See application file for complete search history.

(56) References Cited

U.S. PATENT DOCUMENTS

| | | | |
|---|---|---|---|
| 5,577,191 A * | 11/1996 | Bonomi ...................... | 345/502 |
| 5,796,945 A | 8/1998 | Tarabella | |
| 5,841,438 A | 11/1998 | Cave | |
| 5,864,338 A | 1/1999 | Nestor et al. | |
| 5,889,514 A | 3/1999 | Boezeman et al. | |
| 5,978,648 A | 11/1999 | George et al. | |
| 5,999,173 A * | 12/1999 | Ubillos ....................... | 715/724 |
| 6,016,380 A | 1/2000 | Norton | |
| 6,032,156 A | 2/2000 | Marcus | |
| 6,047,291 A * | 4/2000 | Anderson et al. ........... | 707/792 |
| 6,078,925 A * | 6/2000 | Anderson et al. ........... | 707/784 |
| 6,121,963 A | 9/2000 | Ange | |
| 6,243,092 B1 | 6/2001 | Okita et al. | |
| 6,295,058 B1 | 9/2001 | Hsu et al. | |
| 6,330,004 B1 | 12/2001 | Matsuzawa et al. | |
| 6,389,168 B2 * | 5/2002 | Altunbasak et al. ........ | 382/224 |
| 6,456,779 B1 * | 9/2002 | Saib ........................... | 386/52 |
| 6,542,692 B1 * | 4/2003 | Houskeeper ................ | 386/52 |

(Continued)

OTHER PUBLICATIONS

Juan Casares et al., Simplifying Video Editing Using Metadata, 2002, ACM, Designing Interactive Systems: Proceedings of the 4th Conference, pp. 157-166.*

(Continued)

*Primary Examiner*—Pierre M Vital
*Assistant Examiner*—Taelor Kim
(74) *Attorney, Agent, or Firm*—Fellers, Snider, Blankenship, Bailey & Tippens, P.C.; Terry L. Watt (57) ABSTRACT

There is provided a system and method for creating a digital representation of personal events enhanced with related global content. Personal event frameworks are selectable by the user and are provided with insertion points to receive media items therein and are structured to complement type of personal event. Media items are automatically reformatted as necessary. The instant invention allows the user to enhance the event framework by inserting related global content, wherein global content stands for media items matching either the date, location or event type. The additional content is provided from local sources or over the Internet.

16 Claims, 7 Drawing Sheets

U.S. PATENT DOCUMENTS

| | | | |
|---|---|---|---|
| 6,557,017 | B1 | 4/2003 | Venable |
| 6,760,042 | B2 * | 7/2004 | Zetts ........................... 715/716 |
| 7,149,961 | B2 | 12/2006 | Harville et al. |
| 7,783,154 | B2 * | 8/2010 | Wilkins et al. ................. 386/52 |
| 2002/0033842 | A1 * | 3/2002 | Zetts ........................... 345/719 |
| 2002/0052976 | A1 | 5/2002 | Loesch et al. |
| 2002/0087435 | A1 | 7/2002 | Neishi et al. |
| 2002/0099861 | A1 * | 7/2002 | Miller et al. ................. 709/310 |
| 2002/0109710 | A1 | 8/2002 | Holtz et al. |
| 2002/0138843 | A1 | 9/2002 | Samaan et al. |
| 2003/0001880 | A1 | 1/2003 | Holtz et al. |
| 2003/0034999 | A1 | 2/2003 | Coughlin, III et al. |
| 2003/0051255 | A1 | 3/2003 | Bulman et al. |
| 2003/0090504 | A1 | 5/2003 | Brook et al. |
| 2003/0122860 | A1 * | 7/2003 | Ino ........................... 345/716 |
| 2003/0142124 | A1 * | 7/2003 | Takata et al. ................. 345/723 |
| 2003/0215214 | A1 | 11/2003 | Ma |
| 2004/0080611 | A1 * | 4/2004 | Kakii et al. ............... 348/14.16 |
| 2004/0146275 | A1 * | 7/2004 | Takata et al. .................... 386/52 |
| 2004/0220926 | A1 * | 11/2004 | Lamkin et al. .................. 707/3 |
| 2005/0183018 | A1 * | 8/2005 | Shinkai et al. .............. 715/723 |
| 2006/0233514 | A1 * | 10/2006 | Weng et al. .................... 386/46 |
| 2006/0233537 | A1 * | 10/2006 | Larsen et al. ................ 386/131 |
| 2006/0271977 | A1 * | 11/2006 | Lerman et al. ................. 725/88 |
| 2007/0234214 | A1 * | 10/2007 | Lovejoy et al. .............. 715/719 |
| 2008/0021879 | A1 * | 1/2008 | Cheng ........................... 707/3 |
| 2010/0050080 | A1 * | 2/2010 | Libert et al. ................. 715/716 |

OTHER PUBLICATIONS

Xian-Sheng Hua et al., Optimization-Based Automated Home Video Editing System, May 2004, IEEE, vol. 14. No. 5, pp. 572-583.*

* cited by examiner

SYSTEM AND METHOD FOR A DIGITAL REPRESENTATION OF PERSONAL EVENTS ENHANCED WITH RELATED GLOBAL CONTENT

This application claims the benefit of U.S. Provisional Patent Application Ser. No. 60/915,749, filed on May 3, 2007, the disclosure of which is incorporated herein by reference as if fully set out at this point.

FIELD OF THE INVENTION

The present invention relates generally to the field of digital media editing.

BACKGROUND OF THE INVENTION

The modern consumer is increasingly able to generate large amounts of digital content using commonly available devices such as cell phones, digital cameras, digital video recorders, etc. Nowadays a user can easily obtain digital pictures, videos and audio recordings of social and other events and have that data stored on a personal computer where it can be viewed, copied, edited, etc.

However, given the ease with which digital media can be acquired—and the many opportunities for doing so—it is no surprise that a user's hard disk(s) rapidly fill with media items that were acquired at important life events such as weddings, honeymoons, the birth of a child, birthdays, vacations, graduations, etc. In fact, much of a user's accumulated digital media revolves around such life milestones. For example, a person who is in his fifties might have acquired a fair number of photos and video in connection with his fortieth birthday. Of course, a decade ago digital cameras were not nearly as common as they are today. Although technology exists for converting older photographs and video into a digital format, most do not bother with the time and expense required to do that because the next step—editing the content into a coherent and pleasant viewing experience—requires a skill set that is beyond what the average consumer typically possesses.

The usual approach to editing digital content is generally different depending on the type of media. A number of digital video clips from an event (a clip being operationally defined as the video between a camera recording "start" and "stop"), might be organized and edited into a single video work. In the case of digital still images, a user might just create a hard copy (print) out of selected ones of the images or, in some cases, create a video slideshow using software that is designed for that purpose. In either case, however, the user will likely limit himself or herself to creating a video summary of a single life event, or two closely related events in time (e.g., wedding and honeymoon).

One reason for the "single event" approach to media editing is that the larger problem (i.e., creating a video work that spans several events that occurred over some period of time) is a difficult one and is made more so by the limitations of the tools that are used to prepare the video work. This is for many reasons, but among them are the difficulty in finding the various media items associated with multiple events, most of which will have the default name given to them by the recording device and will be stored in different folders and/or stored on different media. This process of finding, identifying, and integrating media items is time-consuming and puts the entire burden of this effort on the user, i.e., media editing software offers little help in this regard.

As a consequence, preparing a multimedia work that covers a number of different time-separated events from an individual's life is just not an option for most users because the required steps go much beyond the functionality typically provided by media editing software. Additionally, most media editing software is customized to operate with only one media format and, at most events, there will be some combination of still images, video, and even audio that might be useful in commemorating that event.

Thus what is needed is a method that eliminates the above mentioned problems, a method that features an approach that allows the user to quickly and easily create a unified multimedia work that covers multiple events and that uses varied types of media data as input.

Accordingly it should now be recognized, as was recognized by the present inventors, that there exists, and has existed for some time, a very real need for a system and method that would address and solve the above-described problems.

Before proceeding to a description of the present invention, however it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for the creation of a unified digital multimedia representation of a collection of different events, including a collection of events that might occur in a persons life. The instant invention will be designed to automatically integrate global content into that representation, wherein the term "global content" will be used herein to refer to digital media items from an arbitrary number of different sources that are related to a selected event type or to multiple related events.

The preferred embodiment of the instant invention provides a stepwise graphical approach that leads the user through the creation process and provides an easy way of accessing related global content. The preferred system allows the user to select predefined multi-event frameworks that are structured to accommodate a number of different individual event frameworks, with the user being able to add additional event frameworks to suit his or her taste. Additionally, by selecting and adding individual frameworks the user will also be able to build customized multi-event frameworks from scratch. In the preferred embodiment, each framework will act as a guide for the user, a guide that provides a structured approach to integrating event-related digital content into a unified multimedia work.

In brief, the instant invention will allow a user to create multimedia presentations of a number of different kinds of personal events by selecting a predefined multi-event framework that has been specifically created to accommodate these events or by allowing the user to build these multi-event frameworks by him- or herself. The events might be milestone personal events, like a child's first day of school, a confirmation, wedding, etc. However, in some preferred embodiments it will also be possible to select frameworks that are directed toward regularly occurring events, such as birthdays, wedding anniversaries, etc. In the preferred embodiment, a user will have the option of creating his or her own personal multi-event multimedia presentation. For example, a framework could be created that assists a user in compiling a multi-event presentation that only contains every fifth birthday (i.e., in 5 year intervals). In some preferred variations, a user will be given the option of customizing the contents of a predefined multi-event framework by adding new events, deleting existing events, re-ordering existing events, etc. Preferably, each framework will be structured in such as a way as to suggest to the user what type of media file should be inserted into specific sections of that framework. Preferably the instant invention will automatically format the inserted digital media content to fit the requirements of both the multi-event framework and the individual event framework. The preferred method further provides the user with a database that, depending on the defined events, organizes all of the multimedia content—no matter what its format, resolution, etc.—so that it can be readily accessed and selected.

According to a first preferred embodiment, the instant invention will be initiated by the user and a multi-event framework will be selected. Each framework will preferably be designed to accommodate two or more different events, wherein the framework of these events provides the user with guidance regarding the insertion of content into each individual event. The user will preferably process each individual event sequentially, however that is not an requirement. In some preferred embodiments, the predefined multi-event frameworks will include different categories comprising, for example, various events that might occur during a person's lifetime.

In a next preferred step, the user will be allowed to select additional event frameworks to extend the number of events contained in the previously selected multi-event framework. Additionally, in some embodiments the user will also be able to delete or otherwise edit individual events that are contained in a multi-event framework. The event frameworks will also be organized into categories and will preferably be selectable by the user. Preferably, the instant invention will automatically integrate the newly selected events into an existing multi-event framework. Both the multi-event frameworks and the individual event frameworks will preferably be predefined and selectable by the user, with the user being given an option to modify the chosen frameworks to suit the needs of the current project. Preferably, the predefined multi-event frameworks and event frameworks will be provided by the instant inventors and the user will be able to receive new predefined frameworks, multi-event or single, from the instant inventors for example over the internet.

As a next preferred step the user will be required to specify certain values associated with the selected event frameworks. However, whether that step is performed at this point—or earlier or later—is immaterial to the operation of the instant invention. The purpose of this step will be to allow the user to personalize the chosen event frameworks. Additionally, information that is provided at this point might be used subsequently when the instant invention locates and inserts related global content. The user will preferably be asked to specify the date and location of the target event that is to be the subject of the selected event framework and, further, might be asked to provide more detailed information about the target. For example, if the selected event framework is for a "birthday", a user might be prompted to provide detailed information about the event, e.g., it was a $20^{th}$ birthday celebration that was held on 18.06.1987 in Paris, France. These values will preferably be stored as part of the associated multi-event framework along with more generic information about the target event. The instant invention will preferably automatically use the parameter values provided to sort the individual event frameworks, for example, by date. However it is certainly also possible that the user will be permitted to re-arrange the selected event frameworks to his or her liking, independent of their chronological order.

In the next preferred step, the user will be required to insert personal media content into the currently selected event framework. As was mentioned previously, the individual frameworks are designed so that the user will be guided when inserting his or her content. The user will preferably be able to insert any type of digital media data into the selected framework, for example digital images, digital video, digital audio, and also textual data. After the user media content has been inserted and the parameter values discussed previously have been specified, the selected event framework will have been customized. When inserting content, the instant invention will preferably automatically convert and transform it so that the content will be displayed correctly when viewing the completed event framework.

As a next preferred step, the instant invention will automatically extract the parameter values for date, location, and event type from the currently processed event framework. It should be noted however that the steps of providing the user content and the extraction of specific data values might be carried out simultaneously, i.e., the information might be acquired for this purpose as it is entered. The extracted values will preferably be used as a criteria in a search query that operates on a global content database that is a key component of the instant invention. In the preferred arrangement, the global content database will contain a wide variety of information—including information that can be sorted by date or topic. As an example, topics that might be useful in connection with the instant invention include art (e.g., music, video, film, books), politics, celebrities, gossip, natural disasters, sport, science, nature, engineering, etc.

Preferably, the instant invention will utilize the topic selected by the user as part of a query of the global content database. In the preferred embodiment, the search query will be processed and the instant invention will deliver search results relating to the search query back to the user. The search query might be based on data, such as event date, or it might be possible that the search query would be carried out sequentially. That is, and as is described in greater detail below, in one preferred embodiment an initial search for exact matches will be conducted and, if the number of hits does not meet a predetermined threshold value, the search criteria will be systematically broadened and the search performed again. The search results might comprise many different kinds of data and data formats, so in some embodiment the instant invention will display icons representative of the photo images, audio files, video files and textual data (e.g., thumbnails), that were located by the search.

In the preferred embodiment, the search process will utilize an iterative processing cycle, wherein the returned search results are compared with a predefined threshold. Generally, during the initial search the instant invention will fill the search query with the exact user-supplied parameter value (e.g., date). However, it may be that the global content database does not contain any or enough results that exactly match that particular date. In such a circumstance, the instant invention will preferably compare the number of search results with a predefined threshold and, if the number of the search results is above the threshold, the instant invention will display the results for selection by the user. On the other hand, if the number of search results is lower than the predefined threshold the instant invention will preferably automatically broaden the search by, for example, changing a specific date to a range of dates and conducting another search. This process could obviously be continued until the number of search results meets or exceeds the specified threshold. Additionally the user might be given an opportunity to edit or redefine the search parameters, although the automatic search process is the preferred method of operation.

In a next preferred step the search results will be displayed to the user as part of the graphical user interface of the instant invention. The user will select content that he or she finds acceptable and the instant invention will automatically insert the selected items into the current event framework, so that the content is integrated into the corresponding sections. After the media items have been integrated, the user will preferably be given an opportunity to add additional events. If the user does not desire to add additional events, the instant invention will preferably create a multimedia work from the media items provided and according to the event frameworks that have been selected.

It should be clear that an approach such as this would be a tremendous aid to the user who is trying to cope with the many different types of multimedia material, who wants to create multimedia presentations that not only cover a single event or a single episode of a users life, but that cover a number of different life episodes that have some relationship with each other. Additionally, the user will be able to use the database of the instant invention to organize media items and search them by date, location, event type, etc.

The instant invention will preferably provide the user with a simple method of organizing large amounts of multimedia material that might have been collected in a variety of different formats and utilize that material to quickly create meaningful multimedia representations of important episodes from his or her life. The instant method and system represents a change in the typical way of creating multimedia representations of episodes from a persons life, in that it allows the user to put these events or episodes into context and provides the user with an automatic way of inserting related global content. The instant process of creating digital representations of individual episodes from someone's life provides the user with a completely new way to process his or her digital media and also provides the potential audience with an enhanced viewing experience. The whole process is supported by the graphical user interface of the instant invention which guides the user through the complete process and which provides the data, that is determined during the editing process, for easy selection and integration by the user.

The foregoing has outlined in broad terms the more important features of the invention disclosed herein, so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein the reference numerals indicate the same parts throughout the several views, there is provided a system and method for the creation of multimedia representations of personal events, enhanced with related global content. The system and method will allow for the selection and optional editing of event frameworks which are predefined for specific events of the sort that might be typical milestones in a persons life. The instant invention preferably allows the user to insert any sort of digital media into the selected event frameworks and after the user has finished processing the selected event frameworks the instant invention will automatically create a multi-event multimedia presentation, wherein the user can define the content of that multi-event multimedia presentation by selecting the individual event frameworks. Further, the instant invention will preferably provide the user with a supply of media items that relate to the selected event type (e.g., wedding, vacation, promotion, birth, etc.) and can be accommodated by the selected framework.

General Environment of the Invention

Figure 1:
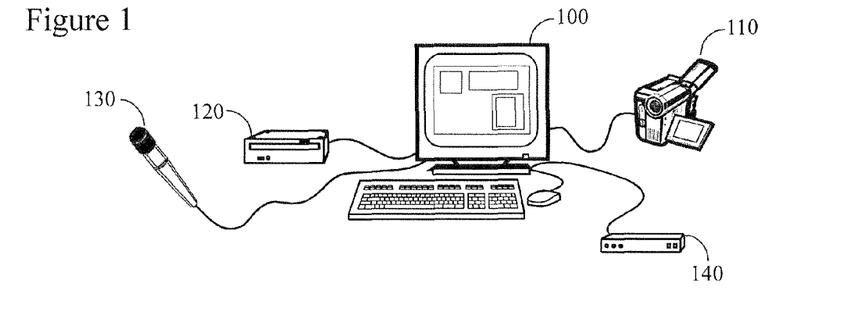
FIG. 1 depicts the general working environment of the instant invention.

As is generally indicated in FIG. 1, at least a portion of the instant invention will be implemented in form of software running on a users computer 100. Such a computer will have some amount of program memory and hard disc storage (whether internal or accessible via a network) as is conventionally utilized by such units. Additionally it is possible that an external camera 110 of some sort might be utilized with—and will preferably be connectable to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a specific multimedia work or can control his or her computer via voice-recognition software and additionally a CD or DVD burner 120 could be useful for storing content on writable or rewritable media. Additionally, an Internet access device 140, preferably a router, will be connected to the network card installed in the computer to allow the user to access the Internet.

Preferred Embodiments

By way of general explanation and in accord with the preferred embodiment, it is to be understood that when the phrase "creation of digital representations of personal events, enhanced with related global content" is used herein that usage will preferably be interpreted as meaning providing the user of a multimedia editing application with a step-wise process that guides the user through the creation process, wherein the step-wise process provides the user with instructions or suggestions that guide the creation process. In a preferred embodiment, the user will select one or more individual event frameworks, which represent individual or a collection of events, to create a multi-event framework. In the preferred embodiment, the structure of each event framework will be predefined by, for example, a software developer such that the user only needs to insert his or her personal content into the framework(s) in order to quickly assemble and create a multimedia representation of the selected event(s). Furthermore the user will be able to increase the quality of the final multimedia product through the use of global media content that has been provided for that purpose.

For purposes of the instant embodiment it should be understood that the invention preferably provides the user with a means of organizing and combining multiple media file types and formats that are associated with one or more life events into a unified multimedia presentation. The instant invention will preferably allow a user to quickly create multimedia presentations that memorialize life events, with the instant invention preferably handling all issues related to media format, size, etc. so that the user can concentrate on building the presentations. In the preferred arrangement, the instant invention will automatically convert, format, and insert any user-selected content into the selected event framework(s), the end product preferably being an integrated multimedia work. Furthermore, the instant invention will preferably allow the user to add global media items that are associated with the selected event type and/or its date, location etc., thereby significantly enhancing the quality of the resulting work.

By way of summary, the main steps in the performance of the instant invention comprise of the selection or creation by the user of one or more individual event frameworks, each of which represents a life event. This will be followed by the selection of the user's own multimedia material that relates to the selected event framework(s). As a next step (which might be along with the inclusion of user media items), the user will preferably be able to select and insert related global content, wherein the phrase "global content" will be used herein to refer to media items that have preferably been previously compiled by a third party and that have been assigned keywords to allow such media item to be associated with an event time, location, type, etc., of the sort that has been selected by the user. Finally, the user selected event framework(s), together with both the user-supplied and global content media items will be rendered to create a unified multimedia work that commemorates the selected event(s).

Turning now to a more detailed discussion of the instant invention, the invention described herein is designed to allow a user to easily compile multimedia works that commemorate life events. The event types that might be pre-defined and available for selection by the user will preferably include, for example, events related to politics, celebrities, sports, science, art, and natural disasters, vacations, weddings, births, deaths, promotions, birthdays, etc.

For each type of user-selectable event will be provided an event framework that has been customized to match that particular event. It will include a selection of appropriate text labels (e.g., "Happy Birthday", "At the Party", "Opening the Presents", "Blowing out the Candles", etc.) that might useful (e.g., as transitions) in preparing a multi-media work concerning this event. It also will include placeholders into which digital image files, MP3 files, video files, etc., can be placed and which will preferably be sequentially rendered in order to compile the final video work. It might also include pre-selected media items (e.g., stock photos, video, audio) for use in intros, outros, etc., which pre-selected items may or may not be editable by the user.

The global content media items will preferably be stored in a "global content database" which will be searchable by the instant invention upon receipt of the appropriate parameter values from the user. The global content media items are digital content that might have been compiled from an arbitrary number of different sources. Each media item will be assigned one or more keywords that indicate its general theme or the contexts in which that media item might be useful. For example, for an event type such as a "wedding", the global content media items it might also include stock photos of wedding cakes, wedding rings, wedding receptions, church interiors, etc., as well as stock videos of flower bouquets and/or garters flying through the air, a bride and groom kneeling at an alter at the front of the church, candles flickering in the wind, and/or MP3 files of wedding music such as Felix Mendelssohn's "Wedding March", etc. Thus, in the preferred arrangement, each media item in the database will be associated with one or more keywords or identifying phrases that describe the context(s) in which that media item might be useful. Thus, and continuing with the present example, each of the example media items listed above would preferably have at least the "wedding" keyword associated with it. It is contemplated that some media items would have multiple uses/contexts (e.g., generic "wedding reception" pictures might also be useful in connection with a general "party" event, a "wedding anniversary" event, etc.) and, in such a circumstance, multiple keywords will preferably be assigned to that item. The keywords might be stored in the same physical file as the media items or separate from it. The media items themselves might be stored locally in a single file, locally in a collection of directories/files, or remotely (e.g., accessible via the Internet).

Figure 2:
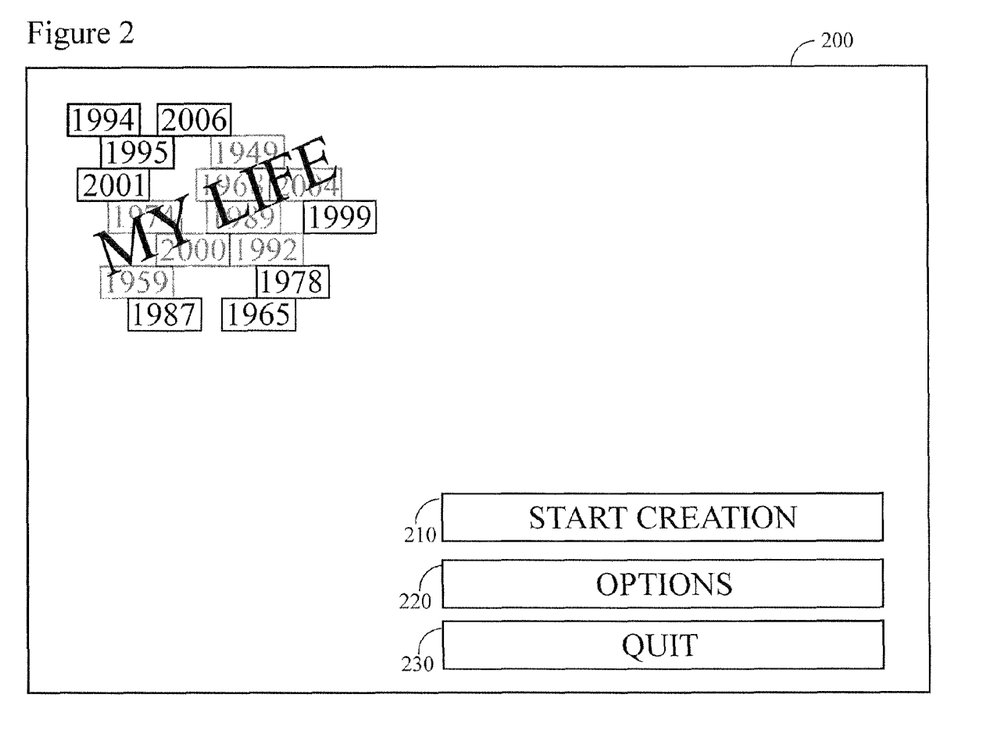
FIG. 2 illustrates the graphical user interface of the instant invention in a first phase.

Turning next to FIG. 2, this figure illustrates a preferred graphical user interface of the instant invention as it might appear in a first phase. As is indicated in this figure, the user will preferably be presented with a computer screen 200 that contains a display similar to the one in this figure. In a preferred arrangement, the user will select from among the menu items 210, 220, and 230 provided in order to initiate the operation of the instant invention. As is indicated in FIG. 2, in some preferred embodiments the user will be able to start the creation of a multi-event multimedia presentation 210. He or she will also be able to specify various program options and settings via menu item 220. For example, the user might be given an opportunity to change program operations parameters (default file types, file locations, input and output media types, etc.), add credit card or related payment details, additionally the user might be able to specify storage priorities for the multi-event framework. As an example, the user might indicate that the multi-event multimedia presentation is to be prepared for storage on a next generation storage medium (e.g., Blu-Ray), which could then result in the preparation of a higher definition end product and/or formatting of the material for storage on a high capacity storage medium. Additionally the user will preferably be able to stop the creation process by selecting the appropriate user control 230.

Figure 3:
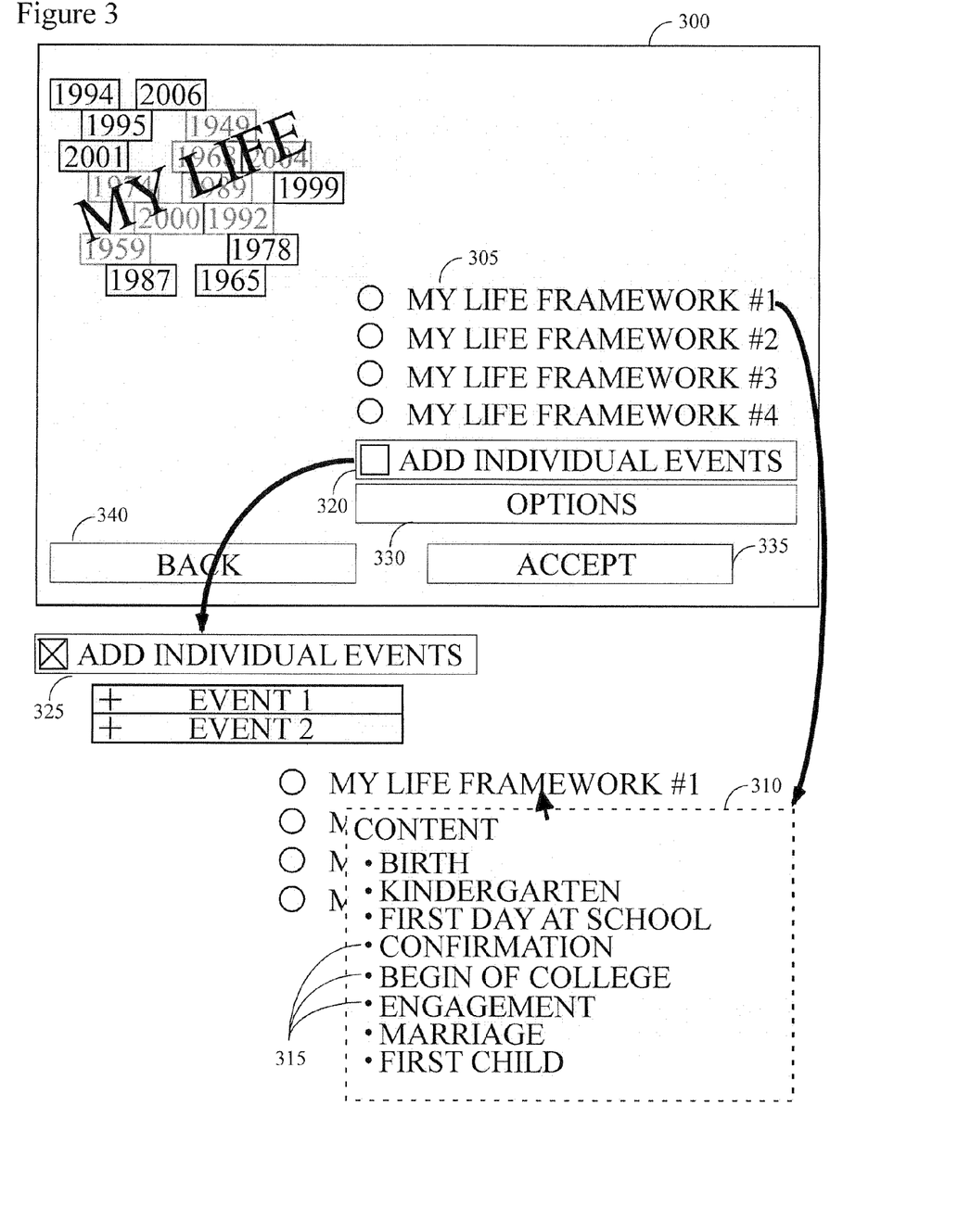
FIG. 3 depicts the graphical user interface of the instant invention in a second phase.

FIG. 3 illustrates a preferred graphical user interface of the instant invention that will be presented to the user when defining and selecting the individual multimedia frameworks (FIG. 2). Additionally, this figure illustrates a preferred embodiment of the appearance of this menu after a user has made the selections indicated. As is indicated in FIG. 3, the user will preferably be presented with computer screen display 300 that allows the user to select from among the offered multi-event frameworks 305. Additionally and preferably, the selection of one of the frameworks 305 will result in the presentation of a submenu 315 of the sort generally indicated in this figure, wherein each submenu 315 item is an individual event framework. In some embodiments the multi-event frameworks 305 will feature more descriptive labels that are designed to quickly provide the user with information regarding the individual multi-event frameworks 315 associated therewith. Further, and as is suggested by FIG. 3, in some preferred embodiment when a multi-event framework 305 is selected (e.g., via use of the keyboard or mouse), the resulting menu 310 will overlay the framework menu 305.

The multi-event frameworks will preferably consist of a plurality of predefined individual event frameworks 315. The multi-event frameworks, of course, will preferably not be strictly limited to predefined content. It is anticipated that the user will be able to add to, delete from, and re-arrange the individual event frameworks 315. Preferably, the instant invention will allow the user to add individual events to a previously selected multi-event framework via menu item 320. After an event framework has been selected, the graphical user interface will preferably provide a program option 325 and 330 that allows the user to add events to the selected multi-event framework. The instant invention will preferably further allow the user to, for example, save or load user-created multi-event frameworks, or to obtain multi-event frameworks over the Internet, etc., via menu item 320. Furthermore the user will preferably be able to proceed to the next step of the instant invention by selecting the "Accept" user control 335. If the user elects otherwise, however, he or she can terminate the creation process via use of the "Back" menu item 340, which will preferably return the user to the main menu of the instant invention.

Figure 4:
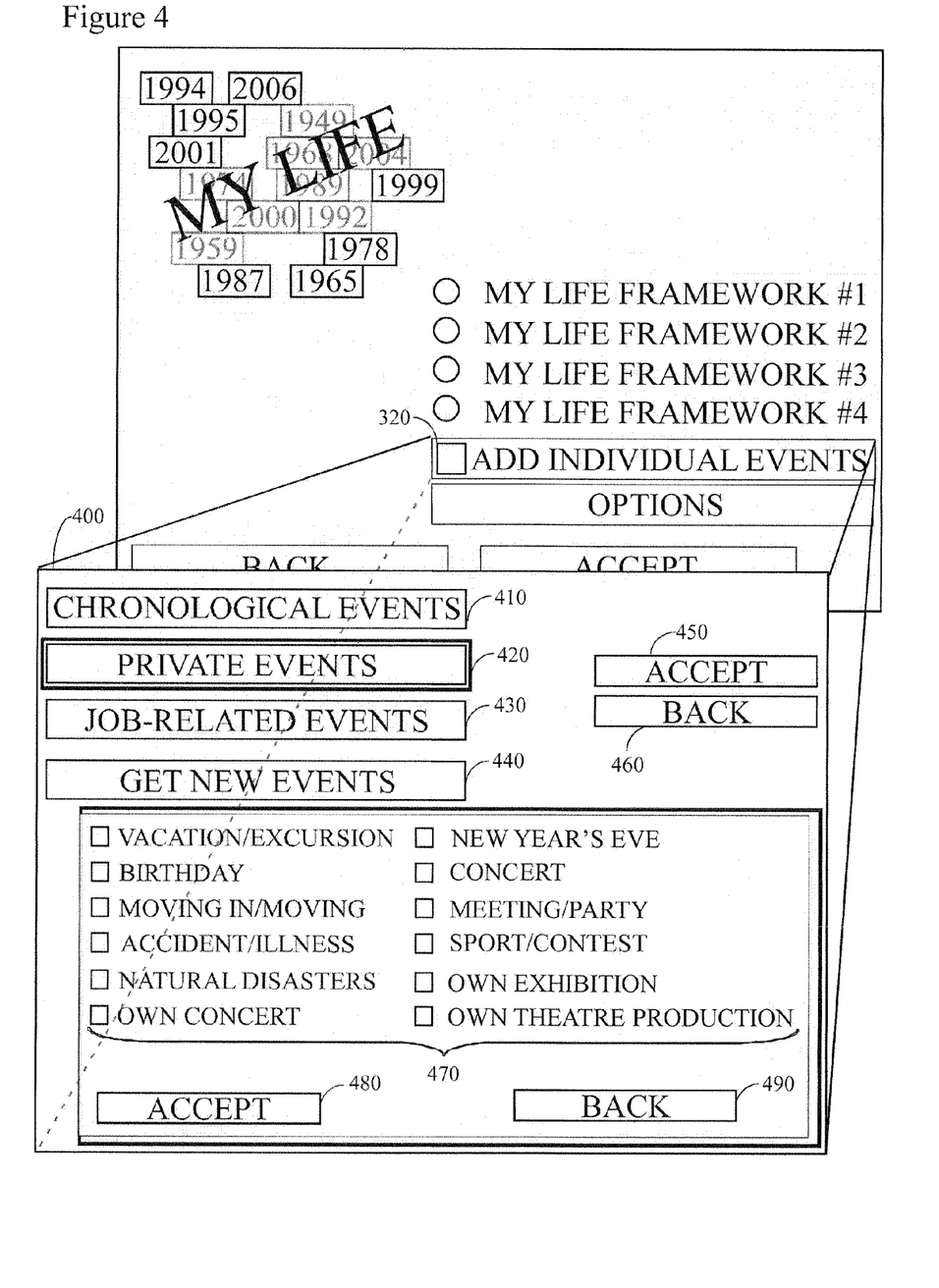
FIG. 4 illustrates the graphical user interface of the instant invention, when selecting the individual event frameworks.

FIG. 4 depicts a preferred graphical user interface of the instant invention of the sort that might displayed after the user has elected to add individual event frameworks to an already selected multi-event framework or to create a completely new multi-event framework. In this example, the user has chosen to add individual events via menu item 320 and is presented with a selection menu 400, from which he or she will preferably be able to select event frameworks sorted into different categories. The user can choose to select chronological events 410 (e.g., the first day of school, wedding, first child, etc.) or private or personal events 420, or job-related events 430 (e.g., launch of a company, relocation, or IPO, etc.). The specific events 470 that are associated with each category will preferably be displayed to the user after selection of an event category for selection by the user. The user might also choose to select new event frameworks 440. In some preferred embodiments those additional event frameworks could be provided by the instant inventors and/or supplied to the user over the Internet, possibly after some sort of payment.

During the selection of individual event frameworks the user will preferably be allowed to select one or more event frameworks, with the selection process preferably be cumulated by activating the "Accept" 480 menu item. Alternatively, the user might choose to go "Back" 490 to the selection of the individual event categories. The user will preferably be able to select and/or define an arbitrary number of different event frameworks spanning the available categories. After the user has finished with the selection process, he or she will preferably be able to signal that intent by activating the "Accept" 450 menu item control. The "Back" 460 menu item would be useful, for example, if the user did not select any event framework but wanted to return to the previous menu.

Figure 5:
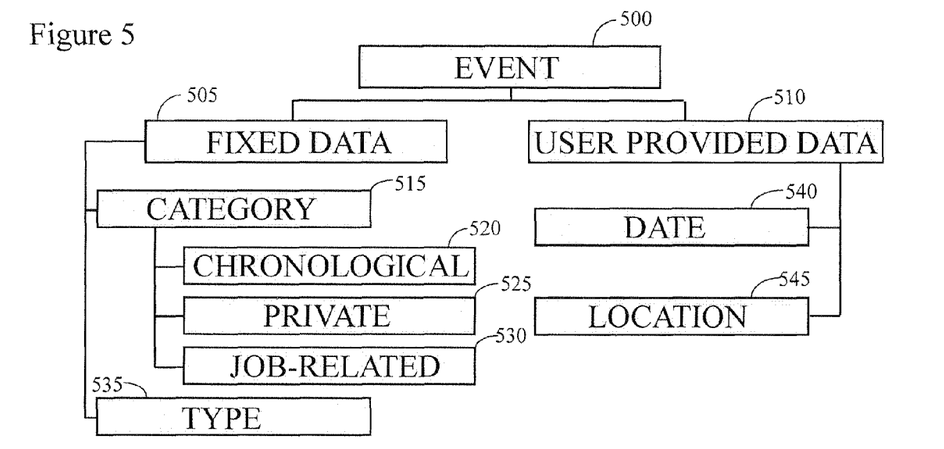
FIG. 5 depicts the data content of one individual event framework.

Turning next to FIG. 5, this figure illustrates a preferred data arrangement within an event framework. The event data structure 500 preferably consists of fixed data 505 e.g., data that is not modifiable by the user and that is an integral part of the event data structure. The category 515 and the event type 535 items will preferably be fixed data values that are characteristic of each individual event framework. The data value of the category will preferably be subdivided into chronological events 520, private events 525, or job-related events 530. The data values describing the category will preferably be used for classification purposes, wherein the data will be used, for some event frameworks, in the search method for the related global content. Additionally, the event framework will also preferably store the user provided data 510, wherein the user provided data describes the date 540 and the location 545 that is connected to the currently processed event framework. In a preferred embodiment, the user will insert these values into the selected event framework, preferably before the insertion of personal content. These data values will also preferably be used as search criteria for the provision of related global content. It should be noted that during the execution of the instant invention the event framework will also preferably receive and store multimedia content that is also a part of the . . . event framework. However, the multimedia content itself is not generally considered to be "data values" for purposes of database searching and, thus, is not illustrated in FIG. 5.

Figure 6:
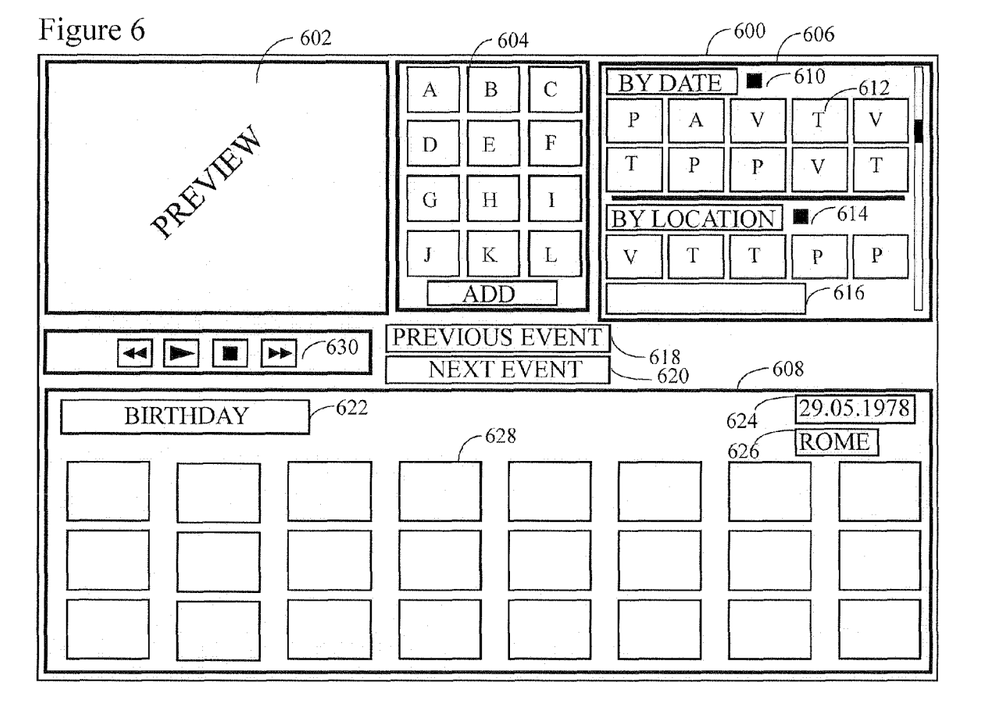
FIG. 6 illustrates the graphical user interface of the instant invention, processing a selected individual event framework.

Now turning to FIG. 6, this figure illustrates a preferred embodiment of a graphical user interface of that sort that might be presented to the user when processing individual event frameworks. The user will preferably be presented with a computer screen display 600 similar to that depicted in FIG. 6. As is indicated in this figure, the computer screen display will preferably be divided into a number of different sections. For example, in some preferred embodiments the screen subdivisions will include a preview section 602, to preview the currently processed event presentation at any time, a section 604 that contains the personal content provided by the user, a section 606 providing the search functionality used in connection with the related global content, and a section containing the event framework 608. Another section 630 will preferably contain on-screen transport controls that are preferably styled to resemble their counterparts on a conventional VCR and that provide a means for the user to use a computer mouse to control playback via functions such as rewind, play, stop/record, fast forward, etc. Those of ordinary skill in the art will recognize that such transport controls are commonplace and well known in media editing programs.

In the specific embodiment of FIG. 6, the user has selected an event framework for a birthday 622, provided information regarding the date of the birthday 624 and the location of the birthday 626. The on-screen graphical user interface additionally provides the user with placeholders 628 into which the user might add his or her personal multimedia material.

The instant invention will preferably provide a means for the user to choose from among his or her own multimedia material (mentioned previously as occupying section 604), which will preferably contain the user's multimedia material, wherein the user preferably has provided the instant invention with the location of that material. The functionality to quickly and easily add related global content is provided in section 606, wherein the instant invention continuously and instantly, after insertion of the data values for date 610 and location 614, provides the search results for these data values. The search results are presented as small preview/thumbnail forms 612 of the actual data content, wherein the data format might consist of video files, digital image (photo) files, audio files and text files. Additionally, the user will preferably be able to manually refine the search results via text entry box 616, if for example the search results are not satisfactory or if the user decides that he or she only wants to see search results connected with date or only connected with the location value. The user will also preferably be able to quickly switch between all of the selected event frameworks by activating the appropriate controls, so he or she could move to the previously processed event 618, or to the next event 620.

Figure 7:
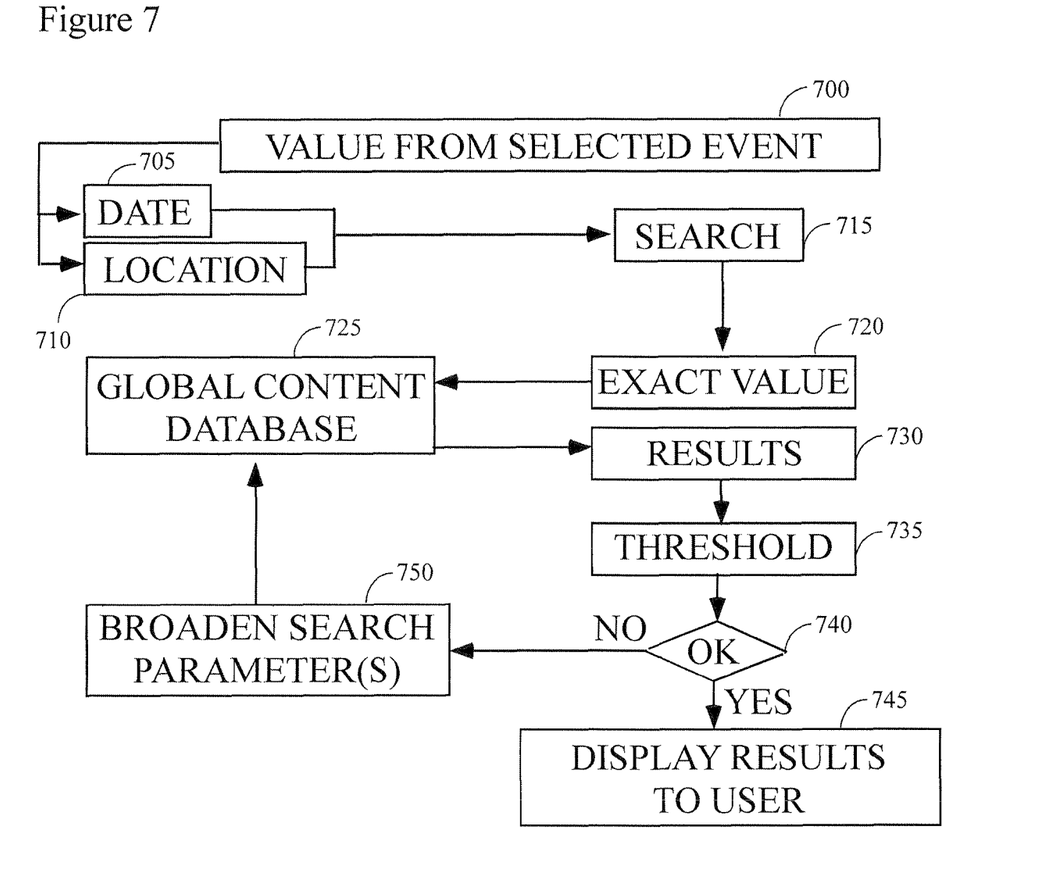
FIG. 7 illustrates the specific search method in the global content database of the instant invention.

FIG. 7 illustrates a preferred search algorithm for the identification and selection of items from the related global content database. This figure depicts a search algorithm that would be appropriate for use when searching using the date 705 and location 710 parameter values. Obviously, searching the database for media items that correspond to other sorts parameter values could be implemented similarly.

According to the instant example, the invention will receive the data value for date and location for the currently selected event 700. The search algorithm will preferably be executed immediately after the user provides such data values. The search process 715 will preferably begin by searching the global content database for media items that have keywords that exactly match the date and location parameters values provided by the user. The search algorithm will query a connected database 725 containing global content and will provide the results 730 of the search query back to the user, preferably in the form of a list of media items (perhaps presented as thumbnails, if appropriate) with matching keywords. The number of media items returned by the search will then be preferably compared to a predefined numerical threshold 735, which specifies the minimum acceptable number of returned search items. If the comparison shows that the number of search results is acceptable (i.e., greater than the threshold 735) the instant invention will preferably update the display 745 of the search results in the appropriate section of the graphical user interface.

However, if the "exact match" search delivered too few search results as compared with the threshold 740, the instant invention will preferably broaden its search 750 by changing exact parameter values to parameter ranges (or, geographic regions instead of individual cities, etc.). After the search has been broadened, the global content database 725 will be searched again, this time with the new search parameters, the results of the new search query thereafter being once again compared to the threshold 740. The instant iterative approach will preferably be terminated at the point where the search is broad enough to return the requisite number of items as measured by the threshold, at which point the search results will preferably be displayed 745 to the user.

Figure 8:
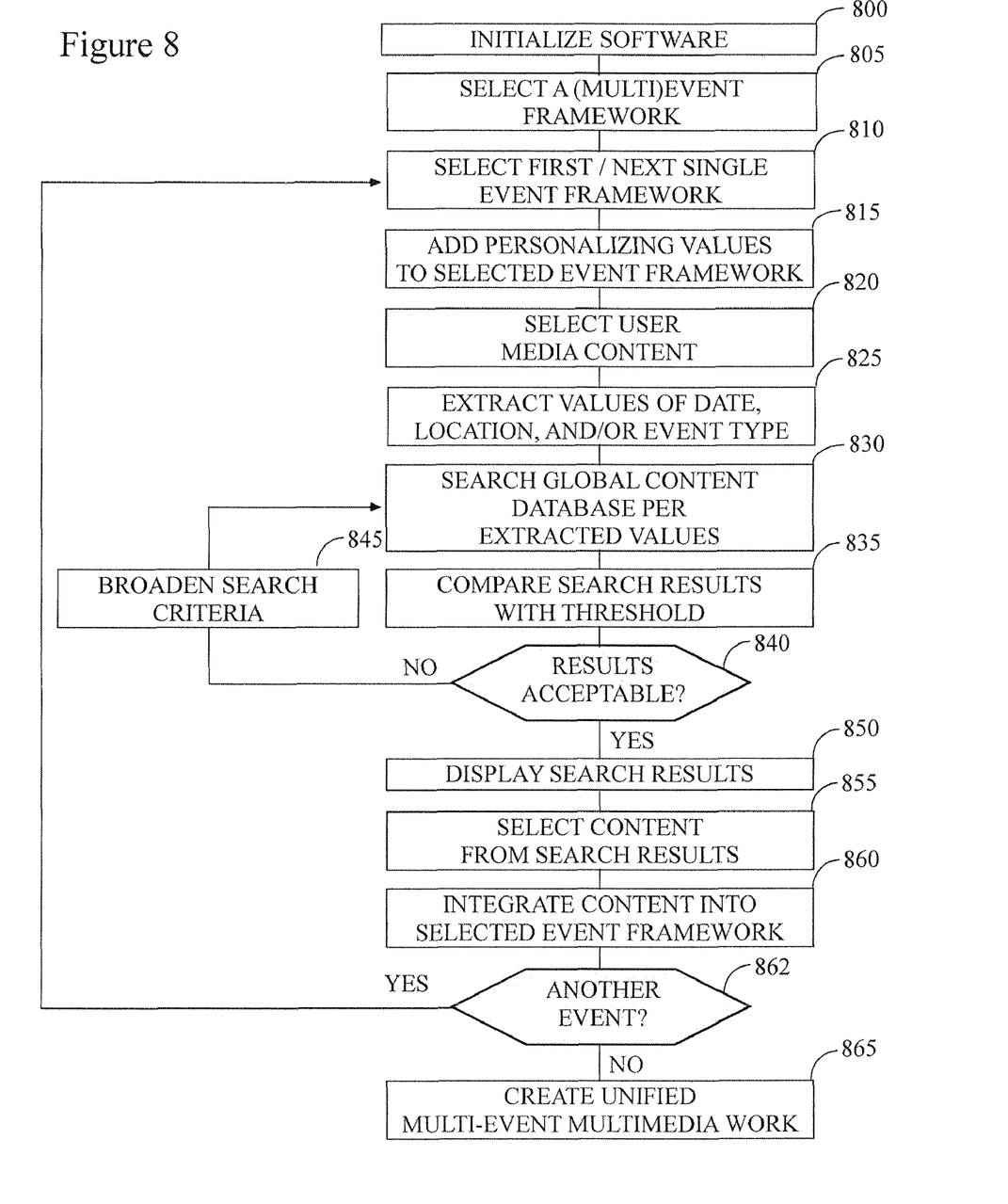
FIG. 8 depicts the complete flowchart of the instant invention.

FIG. 8 contains a description of a preferred workflow of the instant invention. As a first preferred step a computer program that implements the instant method will be initialized 800. Included in this step might be clearing program memory, locating media files (e.g., the global content database), printing the initial menu items, etc. Those of ordinary skill in the art will recognize the sorts of steps that might be typically taken during program initialization.

In a next preferred step the user will compile (or select) a multi- or single-event framework 805 from among those provided. Note that, as has been discussed previously, both single event and multi-event frameworks will typically be provided. An example of a single event framework would be a wedding ceremony. An example of a multi-event framework would be a framework that includes a wedding rehearsal, a wedding rehearsal dinner, the wedding ceremony, the reception, and the honeymoon. In some cases the user might compile his or her own multi-event framework by selecting any number of pre-existing single event frameworks. In any case, step 805 includes selecting one or more event frameworks.

Next, the instant invention will preferably enter a loop that successively processes each single event within the multi-event framework (step 810). Within this loop the user will be provided with an opportunity to personalize 815 the currently selected event by providing information such as its date, time, location, and (if not already clear) the type of event. This last step might be necessary, for example, if the user has selected a generic "party" event framework but wants to further identify it as a "high school graduation party" event before continuing on.

As a next preferred step, the user will select his or her own media content 820 for inclusion in the currently selected single event framework. As has been indicated previously, this content might include digital files such as audio, video, photo/image, and/or textual data. Textual data might include the text of a couple's wedding vows, a poem, a news event, the lyrics of a favorite song (which could be made to automatically scroll over a digital image or video, or be used as a transition, etc.), etc. Preferably, the instant invention will accept user media data of any kind or format and reformat it so that it can be used in the final multimedia work.

In the next preferred step, which might be performed simultaneously with step 820, the instant invention will extract 825 the user-provided personalizing values such as the time, date, location, and event type from the event framework. Those values will then become parameter values which are used in a keyword (or numerical value, etc.) search 830 of the global content database. Additionally, it should be noted that the date and location of the user's event might also be used to search for content related to the event type. For example, a framework for describing a wedding might be supplemented by the user with pictures or text (taken from the user's own digital files or from that of another) from a different wedding, thereby putting the subject wedding into a different perspective.

The instant invention will then preferably use the extracted parameter values to search 830 the content database. During the first such search, only exact media item keywords matches as to location, date, etc. will be returned by the search. Preferably, and as is indicated in FIG. 8, next the number of returned media items will be compared with a predetermined threshold value 835 which might be, for example, five or ten media items. The number of returned media items will be compared 840 with the threshold and, if the threshold is exceeded, the instant invention will preferably display the search results (step 850). However, if the requisite number of media items has not been reached, the instant invention will preferably broaden the search criteria 845 and conduct the search once again. That is, a user's event date will be changed to a date range (or a range of dates will be increased to a broader range), a city name will changed to a county (or state, country, etc.). Of course, if a subsequent search with broader parameters does not return an acceptable number of items, the previous steps (i.e., broadening/searching) will preferably be repeated until such time as sufficient media items are available.

Assuming that the requisite number of media items have been located (the "YES" branch of comparison 840) the instant invention will preferably display the search results 850 for selection by the user. As a next preferred step the user will preferably choose from among the media items presented (step 855), with the chosen items being made a part of the currently selected single event framework. The selected media items will then be integrated into the current single-event framework as is discussed elsewhere (step 860).

If there are other event frameworks that have not been processed (logic item 862, "YES" branch), the instant invention will preferably allow the user to personalize/select media items for these as well by branching back to step 810 and repeating the process discussed above. On the other hand, if the user has personalized and selected media items for each of the single-event frameworks that might be a part of the multi-event framework, the instant invention will preferably render (step 865) the multimedia work using the frameworks, personalization, and media items selected by the user. The rendered video work will then preferably be stored either locally or remotely on computer readable media (e.g., optical disk, magnetic disk, a flash drive, etc.) for subsequent viewing by the user or others.

Figure 9:
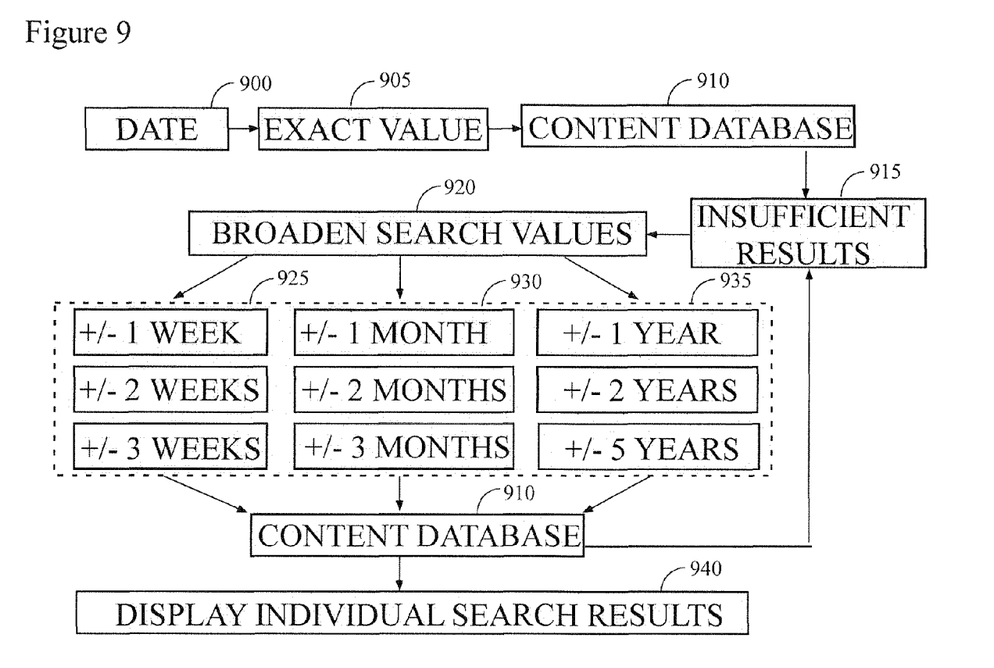
FIG. 9 illustrates a more detailed version of the search method of the instant invention connected to the data value.

Now turning to FIG. 9, this figure illustrates in further detail a preferred search broadening process for use with a global content database. In a preferred embodiment, the date value 900 will be extracted from the currently selected event framework and the exact value 905 will be used as a search query within the global content database 910. Assuming that the "exact" search did not yield the requisite number of hits 915, the date value will be broadened 920 by increasing a precise date first to a range of days 925 (e.g., +/− one week, +/− two weeks, etc). If the user has specified a month (e.g., December) the instant invention will preferably broaden the search to a range of months 931 (e.g., +/− one month, +/− two months, etc). Finally, if the user has specified a year, then the invention will preferably increase that to a range of years 935, before conducting the next search. Note that the search might be sequentially broadened by modifying.

Figure 10:
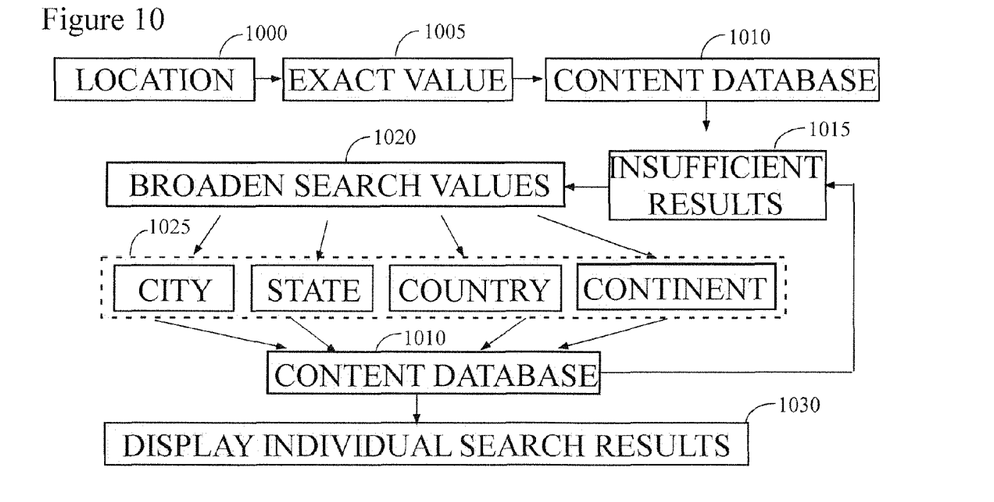
FIG. 10 depicts a more detailed version of the search method of the instant invention connected to the location value.

Finally, FIG. 10 illustrates the broadening search process as applied to a "city" or other location parameter. The location value 1000 will preferably be extracted from the currently selected event framework and the exact value 1005 will be initially used as search query within the global content database 1010. If the number of returned media items is insufficient 1015, the instant invention will broaden the search range 1020. With respect to the current example, the exact location parameter will then be broadened by the instant invention to, for example, search queries related to different locations with keywords that match the city, state, country, nation, and/or continent 1025. The illustrated search queries (city, state, etc.) are not meant to limit the possible search queries. These searches have been offered only for purpose of illustration and those of ordinary skill in the art will readily be able to devise alternatives. The broadened search query will preferably then be matched against the content database 1010, with the search results are once again being compared to a threshold and displayed 1030 to the user if the search results are sufficient. As before, if the results are not sufficient the instant invention will preferably once again broaden the search query until the number of hits is sufficient.

CONCLUSIONS

Of course, many modifications and extensions could be made to the instant invention by those of ordinary skill in the art. For example in one preferred embodiment the user might be able to select complete predesigned frameworks for each individual and important step of a persons life, therewith relieving the user from the need to individually define and select event frameworks and additionally in case of storage to an optical medium the instant invention will automatically monitor the space requirements and capacity of the storage medium to allow the user to store his or her multi-event framework instantly—providing the user with information if problems occur.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those show or suggested herein, may be made therein by those skilled in the art, without departing from the spirit of the inventive concept, the scope of which is to be determined by the following claims.

What is claimed is:

1. A method of generating a multimedia work, wherein is provided a plurality of multi-event frameworks, comprising the steps of:
    (a) selecting a multi-event framework from among said plurality of multi-event frameworks, said selected multi-event framework comprising at least two single event frameworks;
    (b) selecting one of said at least two single event frameworks;
    (c) personalizing said selected single event framework, thereby entering at least one parameter value associated with said selected single event framework;
    (d) selecting at least one personal media item;
    (e) incorporating said selected at least one personal media item into said selected single event framework;
    (f) creating a search query using at least one of said at least one parameter values;
    (g) searching a global content database,
    wherein the searching of said global content database comprises the steps of:
        (1) searching a global content database using said search query, thereby obtaining at least one global media item,
        (2) determining a number of global media items returned by said search,
        (3) comparing said number of global media items against a predetermined threshold value,
        (4) if said number of global media items are greater than or equal to said predetermined threshold value, doing no further searching,
        (5) if said number of global media items are less than said predetermined threshold value, using at least one of said at least one parameter values to create a broader search query,
        (6) performing the steps (1) through (5) with successively broader search queries until said number of global media items are greater than or equal to said predetermined threshold value;

(h) presenting said at least one global media item to the user;
(i) selecting at least one of said at least one global media items;
(j) incorporating said selected at least one global media items into said selected single event framework;
(k) performing steps (b) through (j) until all of said at least two single event frameworks have been processed;
(l) using at least said selected multi-event framework, said at least two single event frameworks, said at least one parameter values, said selected at least one personal media item, and said selected at least one global media item to create said multimedia work; and
(m) storing said multimedia work on computer readable media for subsequent viewing by at least one viewer.

2. A method of generating a multimedia work according to claim 1, wherein each of said at least two single event frameworks is associated with a life event selected from a group consisting of a chronological event, a private event, and a job-related event.

3. A method of generating a multimedia work according to claim 2, wherein said chronological event is selected from a group consisting of a birthday, and, a Christmas celebration, wherein said private event is selected from a group consisting of a vacation, a confirmation, a wedding, a wedding anniversary, and, a graduation, and, wherein said job-related event is selected from a group consisting of a hiring, a raise, an offer of partner, and a 5 year job anniversary.

4. A method of generating a multimedia work according to claim 1, wherein each of said single event frameworks comprises at least one placeholder for receipt of a personal media item therein, and wherein step (e) comprises the step of:
incorporating said selected at least one personal media item into said selected single event framework by placing each of said selected at least one personal media item into one of said at least one placeholder.

5. A method of generating a multimedia work according to claim 1, wherein step (c) comprises the step of: personalizing said selected single event framework by entering at least one of a date and a location, thereby entering at least one parameter value associated with said selected single event framework.

6. A method of generating a multimedia work according to claim 1, wherein said at least one personal media item of step (d) is selected from a group consisting of a digital photo, a digital video clip, and a digital audio clip, and wherein step (e) comprises the steps of:
(e1) automatically adapting each of said personal media items to a format compatible with said selected single-event framework, and
(e2) incorporating said adapted at least one personal media item into said selected single event framework.

7. A method of generating a multimedia work according to claim 1, wherein said selected single event framework has an event type associated therewith, and wherein step (f) comprises the step of:
creating a search query using at least one of said at least one parameter value and using said event type associated with said selected single event framework.

8. A method of generating a multimedia work according to claim 1, wherein said selected single event framework has an event type, and wherein each of said at least one global media items has a theme related to said event type.

9. A method of creating a digital multimedia work representative of a plurality of personal events, comprising the steps of:
(a) selecting a plurality of individual event frameworks from a plurality of individual event frameworks;
(b) combining said plurality of individual event frameworks to produce a multi-event framework;
(c) selecting one of said plurality of individual event frameworks;
(d) personalizing said selected individual event framework, thereby providing at least one parameter value relevant to at least one of said plurality of personal events;
(e) inserting at least one personal media item into said selected at least one individual event framework;
(f) creating a search query based on said at least one parameter value;
(g) searching a global content database,
wherein the searching a global content database comprises the steps of:
(1) searching a global content database using said search query, thereby obtaining at least one global media item,
(2) determining a number of global media items returned by said search,
(3) comparing said number of global media items against a predetermined threshold value,
(4) if said number of global media items are greater than or equal to said predetermined threshold value, doing no further searching,
(5) if said number of global media items are less than said predetermined threshold value, using at least at least one of said at least one parameter values to create a broader search query,
(6) performing above steps (1) through (5) with successively broader search queries until said number of global media items are greater than or equal to said predetermined threshold value.
(h) presenting said at least one global media item to a user;
(i) selecting at least one global media item from among said at least one global media item;
(j) inserting said at least one selected global item into said selected individual event framework;
(k) performing steps (b) through (j) until all of said individual event frameworks of said multi-event framework have been processed;
(l) creating said multimedia work using at least said multi-event framework;
(m) storing said multimedia work on a computer medium; and
(n) performing said multimedia work for at least one viewer.

10. A method of creating a digital multimedia work representative of a plurality of personal events according to claim 9, wherein each of said at least two single event frameworks is associated with a life event selected from a group consisting of a chronological event, a private event, and job-related event.

11. A method of creating a digital multimedia work representative of a plurality of personal events according to claim 10, wherein said chronological event is selected from a group consisting of a birthday, and a Christmas celebration, wherein said private event is selected from a group consisting of a vacation, a confirmation, a wedding, a wedding anniversary, and a graduation, and wherein said job-related event is selected from a group consisting of a hiring, a raise, an offer of partner, and a 5 year job anniversary.

12. A method of creating a digital multimedia work representative of a plurality of personal events according to claim 9, wherein each of said individual event frameworks comprises at least one placeholder for receipt of a personal media item therein, and wherein step (j) comprises the step of: incorporating said selected at least global media item into said selected individual event framework by placing each of said selected at least one global media item into one of said at least one individual event placeholders.

13. A method of creating a digital multimedia work representative of a plurality of personal events according to claim 9, wherein step (d) comprises the step of: personalizing said selected individual event framework by entering at least one of a date and a location, thereby entering at least one parameter value associated with said selected individual event framework.

14. A method of creating a digital multimedia work representative of a plurality of personal events according to claim 9, wherein said at least one personal media item of step (e) is selected from a group consisting of a digital photo, a digital video clip, and a digital audio clip, and wherein each of said at least one personal media item is automatically adapted to a format compatible with said selected individual event before said at least one personal media item is inserted into said selected individual event framework.

15. A method of creating a digital multimedia work representative of a plurality of personal events according to claim 9, wherein at least a date and a location are provided for one of said plurality of personal events, and wherein said created search query is based at least one said date and said location.

16. A method of creating a digital multimedia work representative of a plurality of personal events according to claim 1, wherein said selected single event framework has an event type, and wherein each of said at least one global media items has a theme related to said event type.

* * * * *